United States Patent
Watanabe

(10) Patent No.: US 11,486,863 B2
(45) Date of Patent: Nov. 1, 2022

(54) METHOD OF MEASURING ACCURACY OF CONCENTRATION IN SENDING LIQUID IN GRADIENT AND LIQUID CHROMATOGRAPH HAVING FUNCTION OF EXECUTING METHOD

(71) Applicant: SHIMADZU CORPORATION, Kyoto (JP)

(72) Inventor: Satoru Watanabe, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 22 days.

(21) Appl. No.: 15/734,639

(22) PCT Filed: Dec. 19, 2018

(86) PCT No.: PCT/JP2018/046695
§ 371 (c)(1),
(2) Date: Dec. 3, 2020

(87) PCT Pub. No.: WO2019/234955
PCT Pub. Date: Dec. 12, 2019

(65) Prior Publication Data
US 2021/0231622 A1    Jul. 29, 2021

(30) Foreign Application Priority Data
Jun. 7, 2018 (JP) .............................. JP2018-109120

(51) Int. Cl.
*G01N 30/34* (2006.01)
*G01N 30/86* (2006.01)
*G01N 30/02* (2006.01)

(52) U.S. Cl.
CPC ............. *G01N 30/34* (2013.01); *G01N 30/86* (2013.01); *G01N 2030/027* (2013.01)

(58) Field of Classification Search
CPC ......... B29C 45/1679; B29L 2031/7622; B32B 2250/00; B32B 2255/00; B32B 2255/10;
(Continued)

(56) References Cited

U.S. PATENT DOCUMENTS 11,009,488 B2 * 5/2021 Yamamoto ............. G01N 30/02
2002/0107652 A1 * 8/2002 Andrews ................ G01N 30/88
702/104
(Continued)

FOREIGN PATENT DOCUMENTS

JP       2002071657 A  *  3/2002
JP       2008155173 A  *  7/2008

OTHER PUBLICATIONS

International Search Report for corresponding Application No. PCT/JP2018/046695, dated Mar. 12, 2019.
(Continued)

*Primary Examiner* — Nimeshkumar D Patel
*Assistant Examiner* — Gedeon M Kidanu
(74) *Attorney, Agent, or Firm* — Renner, Otto, Boisselle & Sklar, LLP

(57) ABSTRACT

An organic solvent containing liquid that does not include a component to be detected by a detector is used as a first solvent, and an organic solvent containing liquid that includes the component to be detected and is adjusted to have a concentration of an organic solvent that prevents a separation column from actually holding the component to be detected is used a second solvent. Further, a mobile phase is sent while a setting value of a concentration of the second solvent in the mobile phase is changed over time with the separation column provided on an analysis flow path, and an actual concentration of the second solvent in the mobile phase is found based on a detection signal of the detector when the mobile phase is sent at each setting value.

4 Claims, 3 Drawing Sheets

(58) Field of Classification Search
CPC .......... B32B 2307/30; B32B 2307/304; B32B 2457/00; B32B 2509/00; B32B 2509/10; B32B 27/00; B32B 27/06; B32B 27/08; B32B 3/00; B32B 3/02; B32B 3/12; G01N 2030/027; G01N 30/34; G01N 30/86

See application file for complete search history.

(56) References Cited

U.S. PATENT DOCUMENTS

| | | | |
|---|---|---|---|
| 2009/0294363 A1* | 12/2009 | Liu ........................ | G01N 30/34 210/96.1 |
| 2014/0040323 A1* | 2/2014 | Nakao ................... | G06F 16/583 707/812 |
| 2016/0202218 A1* | 7/2016 | Owa ....................... | G01N 30/16 73/23.41 |
| 2017/0276652 A1* | 9/2017 | Funada .................... | G06G 7/75 |
| 2019/0285592 A1* | 9/2019 | Yamamoto ............. | G01N 30/02 |

OTHER PUBLICATIONS

Written Opinion for corresponding Application No. PCT/JP2018/046695, dated Mar. 12, 2019 (English Translation).

* cited by examiner

METHOD OF MEASURING ACCURACY OF CONCENTRATION IN SENDING LIQUID IN GRADIENT AND LIQUID CHROMATOGRAPH HAVING FUNCTION OF EXECUTING METHOD

TECHNICAL FIELD

The present invention relates to a method of measuring accuracy in sending liquid in a gradient that is one of the items for performance evaluation of an LC system (a liquid chromatography system) and the LC system having the function of executing the method.

BACKGROUND ART

The measurement items for performance evaluation of the LC system include measurement of noise and drift, measurement of accuracy of concentration in sending liquid in a gradient, measurement of reproducibility and the like.

In the measurement of noise and drift, a mobile phase is sent at a certain flow rate, and a noise value and a drift value of a signal of a detector at the time of sending are measured respectively.

In the measurement of accuracy of concentration in sending liquid in the gradient, two type of liquids which are water and a caffeine aqueous solution are used as mobile phase solvents, a mobile phase is sent while the setting value of concentration of the caffeine aqueous solution in the mobile phase is changed over time, and the actual concentration of caffeine when the mobile phase is sent at each setting value is measured based on a signal of the detector. In a case where a difference between the found actual concentration and the setting value is equal to or smaller than a predetermined value (the ratio of difference to the setting value is equal to or smaller than 1%, for example), it can be evaluated that the concentration in sending liquid in the gradient is accurate.

In the measurement of reproducibility, an analysis is carried out multiple times with use of a test sample, and the variation rate of a peak area is measured.

SUMMARY OF INVENTION

Technical Problem

In the measurement of accuracy of concentration in sending liquid in the gradient, in a case where a separation column is provided on an analysis flow path, caffeine is held in the separation column and concentrated, and the accuracy in sending liquid in the gradient by a liquid sender cannot be evaluated properly. Therefore, when the measurement of accuracy of concentration in sending liquid in the gradient is to be carried out, it is necessary to detach the separation column from the analysis flow path.

Meanwhile, the measurement of noise and drift and the measurement of reproducibility are carried out with the separation column provided on the analysis flow path. Therefore, only in a case where the measurement of accuracy of concentration in sending liquid in the gradient is executed when the performance evaluation of the LC system is carried out, a worker had to detach the separation column from the analysis flow path, and all of the measurement items could not be executed successively.

As such, an object of the present invention is to enable successive execution of a plurality of measurement items for performance evaluation of an LC system.

Solution to Problem

A method according to the present invention is a method of measuring accuracy of concentration in sending liquid in a gradient by a liquid sender in a liquid chromatography system, which has the liquid sender that is capable of adjusting a concentration of a second solvent in a mobile phase made of a first solvent and the second solvent to a predetermined setting value and sending the mobile phase and is provided with a separation column and a detector on an analysis flow path through which the mobile phase from the liquid sender flows. With the method, an organic solvent containing liquid that does not include a component to be detected by the detector is used as the first solvent, and an organic solvent containing liquid that includes the component to be detected and is adjusted to have a concentration of an organic solvent that prevents the separation column from actually holding the component to be detected is used as the second solvent. Then, the mobile phase is sent while a setting value of the concentration of the second solvent in the mobile phase is changed over time with the separation column provided on the analysis flow path, an actual concentration of the second solvent in the mobile phase that is sent at each setting value is found based on a detection signal of the detector and the accuracy of concentration in sending liquid in the gradient is measured.

That is, with the method according to the present invention, the organic solvent containing liquid that contains an organic solvent is used in both of the first solvent and the second solvent that are sent by the liquid sender. Further, in case of any concentration of the second solvent in the mobile phase flowing through the analysis flow path, the component to be detected is prevented from being actually held in the separation column. Thus, even with the separation column provided on the analysis flow path, it is possible to execute the measurement of accuracy of concentration in sending liquid in the gradient without being affected by holding of the component to be detected in the separation column. Therefore, the measurement of accuracy of concentration in sending liquid in the gradient to which the method of present invention is applied and the measurement items such as the measurement of noise and drift and the reproducibility measurement can be executed successively.

One example of the component to be detected is caffeine, and one example of the organic solvent is methanol. That is, the liquid mixture of water and methanol can be used as the first solvent, and the liquid mixture of water and methanol containing caffeine can be used as the second solvent.

An LC system according to the present invention includes a liquid sender that is capable of adjusting a concentration of a second solvent in a mobile phase made of a first solvent and the second solvent to a predetermined setting value and sending the mobile phase, an analysis flow path through which the mobile phase from the liquid sender flows, a separation column that is provided on the analysis flow path and to separate a sample injected into the analysis flow path and a detector that is provided at a position farther downstream than the separation column on the analysis flow path and to detect a component of a sample separated in the separation column, and includes a function of executing the above-mentioned method of measuring accuracy of concentration in sending liquid in the gradient. That is, the liquid chromatograph according to the present invention includes a gradient accuracy measurer configured to use an organic solvent containing liquid that does not include a component to be detected by the detector as the first solvent, use an organic solvent containing liquid that includes the component to be detected as the second solvent, send the mobile phase while changing a setting value of the concentration of the second solvent in the mobile phase over time, find an actual concentration of the second solvent in the mobile phase that is sent at each setting value based on a detection signal of the detector, and measure the accuracy of concentration in sending liquid in a gradient.

Advantageous Effects of Invention

With the method according to the present invention, the organic solvent containing liquid containing an organic solvent is used in both of the first solvent and the second solvent such that the component to be detected is prevented from being actually held in the separation column. Therefore, even with the separation column provided on the analysis flow path, measurement of accuracy of concentration in sending liquid in the gradient can be executed without being affected by holding of the component to be detected in the separation column. Therefore, the measurement of accuracy of concentration in sending liquid in the gradient and the measurement items for performance evaluation of the LC system such as the measurement of noise and drift and the reproducibility measurement can be executed successively.

Because the LC system according to the present invention includes the function of executing the above-mentioned method of measuring accuracy in sending liquid in the gradient, it is possible to execute the plurality of measurement items for performance evaluation of the LC system without performing an operation of attaching and detaching the separation column with respect to the analysis flow path.

DESCRIPTION OF EMBODIMENTS

One inventive example of a method of measuring accuracy in sending liquid in a gradient and an LC system including the function according to the present invention will be described below.

Figure 1:
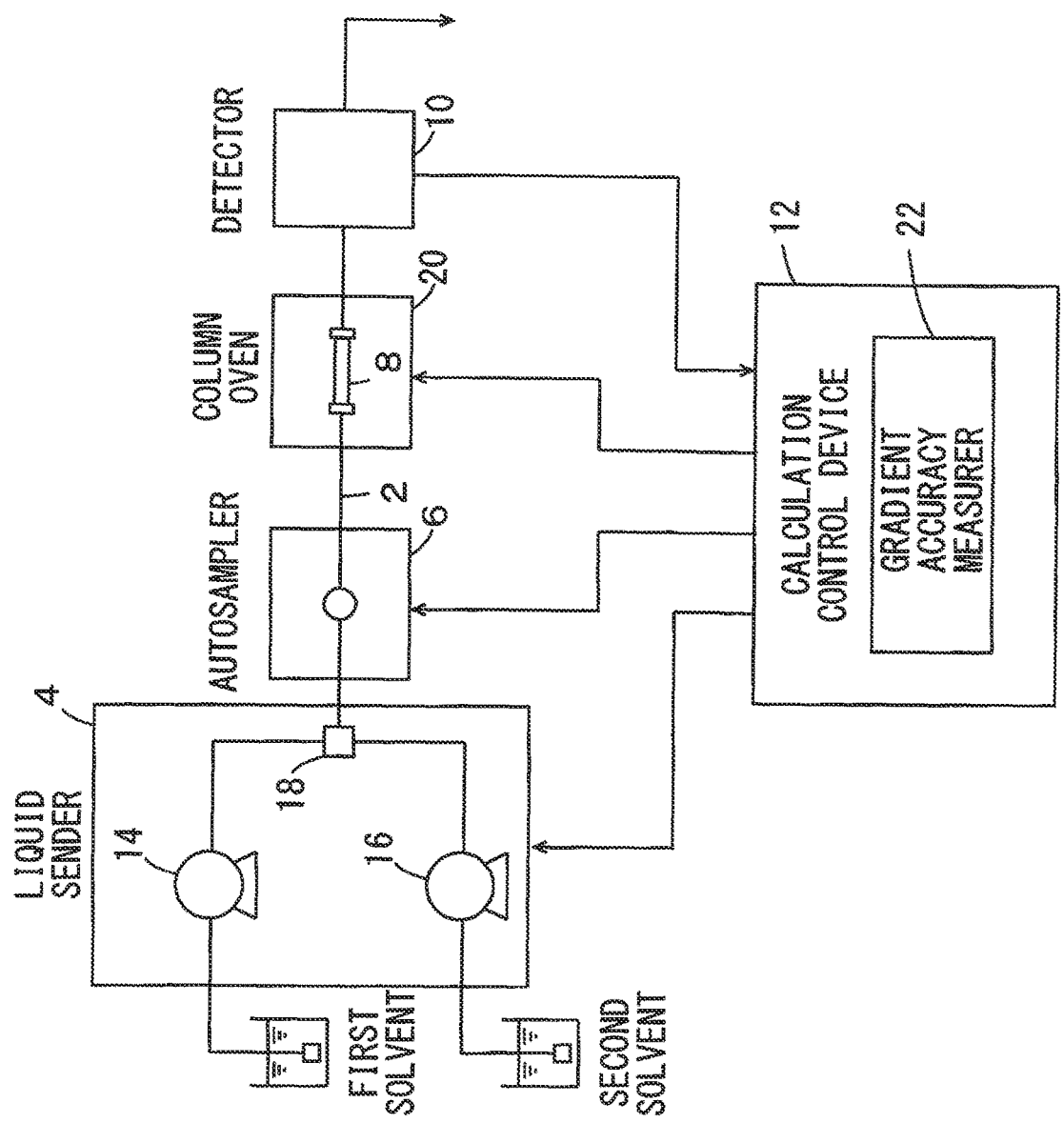
FIG. 1 A diagram of the configuration of a flow path schematically showing one inventive example of an LC system.

As shown in FIG. 1, the LC system includes an analysis flow path 2, a liquid sender 4, an autosampler 6, a separation column 8, a detector 10 and a calculation control device 12.

The liquid sender 4 includes a liquid sending pump 14 for sending a first solvent, a liquid sending pump 16 for sending a second solvent and a mixer 18 for mixing the first solvent and the second solvent that are sent by the liquid sending pumps 14, 16. The liquid mixture of the first solvent and the second solvent that are mixed in the mixer 18 flows through the analysis flow path 2 as a mobile phase. The liquid sender 4 has a function of adjusting the operating speeds of the liquid sending pumps 14, 16 such that the concentration of the second solvent in the mobile phase that are made of the first solvent and the second solvent mixed in the mixer 18 is a setting value supplied from the calculation control device 12.

The autosampler 6, the separation column 8 and the detector 10 are provided in this order from an upstream position on the analysis flow path 2 through which the mobile phase from the liquid sender 4 flows. The autosampler 6 is to inject a sample into the analysis flow path 2. The separation column 8 is to separate the sample that is injected into the analysis flow path by the autosampler 6. The separation column 8 is stored in a column oven 20. The column oven 20 is to control the temperature of the separation column 8 to a set temperature. The detector 10 is to detect a component of the sample separated in the separation column 8.

The calculation control device 12 has a function of controlling the operations of the liquid sender 4, the autosampler 6 and the column oven 20 and has a function of carrying out various calculation and creating a chromatogram based on a detection signal obtained in the detector 10. The calculation control device 12 further includes a gradient accuracy measurer 22 as a function. The calculation control device 12 is realized by a dedicated computer or a general personal computer. The gradient accuracy measurer 22 is a function obtained by execution of a predetermined program by an arithmetic element provided in the calculation control device 12.

The gradient accuracy measurer 22 is configured to execute measurement of accuracy of concentration in sending liquid in the gradient, which is one of the measurement items for performance evaluation of the LC system. In the measurement of accuracy of concentration in sending liquid in the gradient, an organic solvent containing liquid containing an organic solvent such as methanol is used as the first solvent, an organic solvent containing liquid including a component to be detected by the detector 10 such as caffeine is used as the second solvent, the setting value of concentration of the second solvent in the mobile phase is changed over time in accordance with a preset time chart, and the actual concentration of the second solvent in the mobile phase when the mobile phase is being sent at each setting value is found based on a detection signal from the detector 10.

Letting the intensity of a detection signal obtained when the setting value of concentration of the second solvent is 0(%) be $S_{(0)}$, letting the intensity of a detection signal obtained when the setting value of concentration of the second solvent is 100(%) be $S_{(100)}$ and letting the intensity of a detection signal obtained when the setting value of concentration of the second solvent is k (%) be $S_{(k)}$, the actual concentration of the second solvent can be found by a following formula.

$$(S_{(k)}-S_{(0)})/(S_{(100)}-S_{(0)})$$

In a case where a difference between the actual concentration found by the above-mentioned formula and the setting value is equal to or smaller than a reference value (1% of the setting value, for example), it is evaluated that adjustment of concentration of the mobile phase by the liquid sender 4 with respect to the setting value is accurate.

Figure 2:
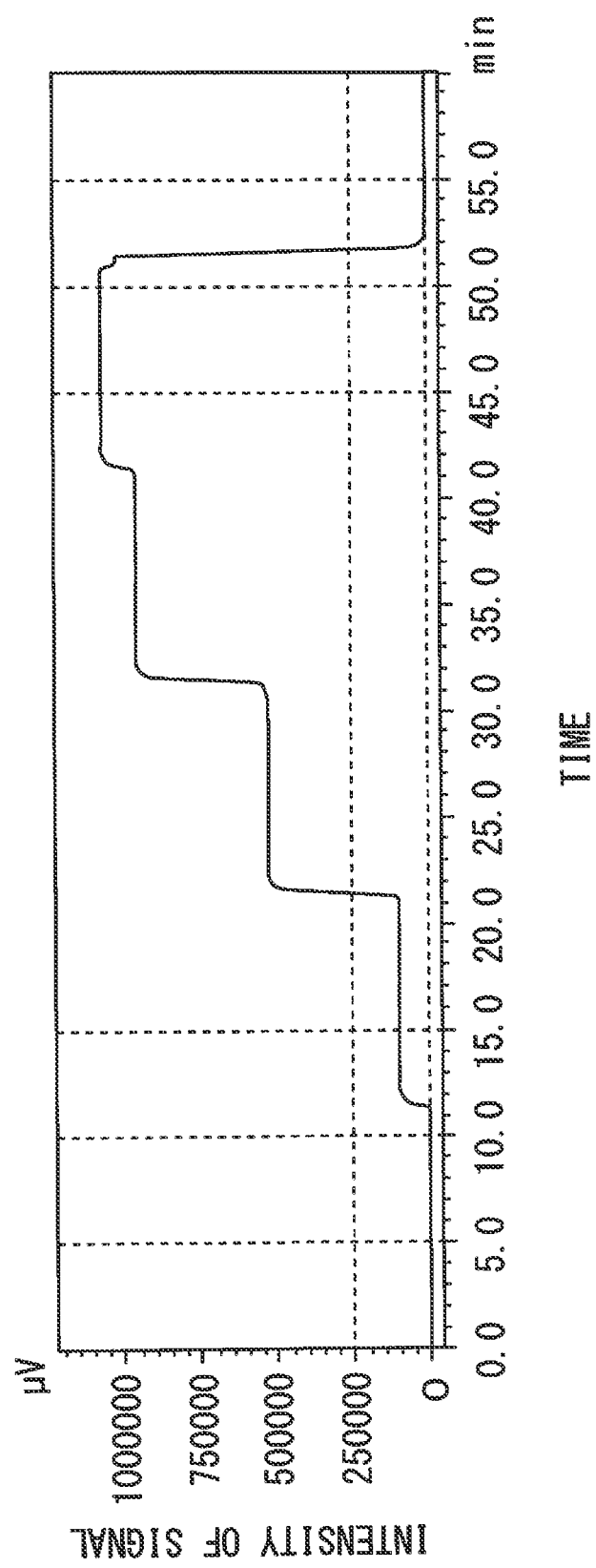
FIG. 2 A graph showing a result of measurement of accuracy in sending liquid in a gradient that is executed in the same inventive example.

FIG. 2 is one example of a chromatogram obtained when accuracy of concentration in sending liquid in the gradient is measured. In this measurement, a liquid mixture of water and methanol (the volume ratio of water to methanol=7:3) was used as the first solvent, and a liquid mixture of water and methanol to which caffeine was added (the volume ratio of water to methanol=7:3, the concentration of caffeine=20 ppm) was used the second solvent.

Further, an ODS column was used as the separation column 8, and the absorbance was measured at the wavelength of 272 nm by the absorbance detector 10. The time chart of the setting values of concentration of the second solvent in the mobile phase in regard to the liquid sender 4 is as follows.

| Time (minutes) | Setting values of concentration of the second solvent (%) |
|---|---|
| 0-10 | 0 |
| 10-20 | 10 |
| 20-30 | 50 |
| 30-40 | 90 |
| 40-50 | 100 |
| 50-60 | 0 |

Each setting value of concentration of the second solvent, the intensity of signal at the time of measurement and the actual concentration of the second solvent found based on the intensity of signal are as follows.

| Setting value (%) | Intensity of signal (µV) | Actual concentration (%) |
|---|---|---|
| 0 | 1 | — |
| 10 | 107402 | 10.09 |
| 50 | 530675 | 49.88 |
| 90 | 957999 | 90.04 |
| 100 | 1064022 | 100 |

With reference to the above-mentioned results of measurement, it can be evaluated that any of the actual concentrations is in a range of ±1% of the setting value when the setting value of concentration of the second solvent is 10%, 50% or 90%, and adjustment of concentration of the mobile phase by the liquid sender 4 in the gradient is accurate.

Figure 3:
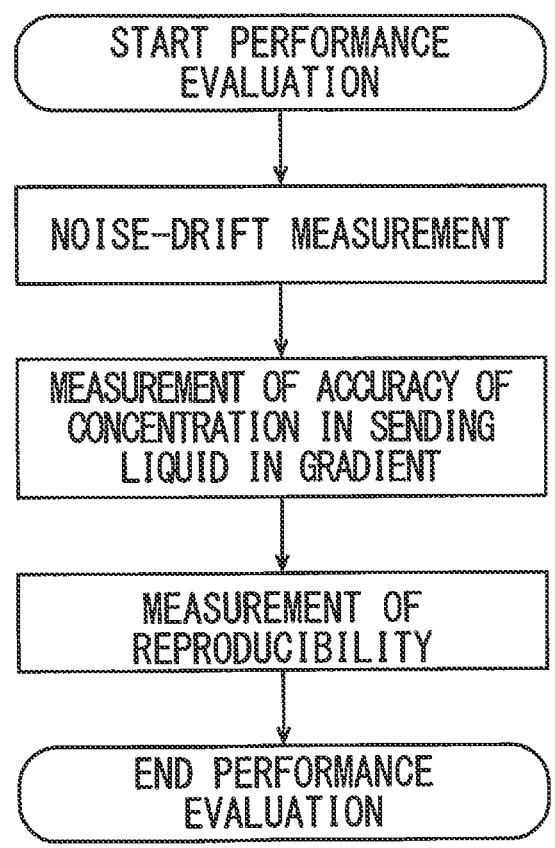
FIG. 3 A flowchart for explaining one example of a flow of a series of performance evaluation of the LC system.

In this manner, it is found that it is possible to accurately execute measurement of accuracy of concentration in sending liquid in the gradient even with the separation column 8 provided on the analysis flow path 2 by causing an organic solvent to be contained in both of the first solvent and the second solvent and preventing the component (caffeine) to be detected by the detector 10 from being actually held in the separation column 8. The measurement of accuracy of concentration in sending liquid in the gradient can be executed with the separation column 8 provided on the analysis flow path 2, whereby the respective measurement items for the performance evaluation of the LC system, that are, the measurement of noise and drift, the measurement of accuracy of concentration in sending liquid in the gradient and measurement of reproducibility can be executed successively as shown in FIG. 3.

While a high-pressure gradient type liquid sender is used as the liquid sender 4 in the above-mentioned inventive example, the present invention can be applied similarly to an LC system including a low-pressure gradient type liquid sender.

REFERENCE SIGNS LIST

2 Analysis flow path
4 Liquid sender
6 Autosampler
8 Separation column
10 Detector
12 Calculation control device
14, 16 Liquid sending pumps
18 Mixer
20 Column oven
22 Gradient accuracy measurer

The invention claimed is:

1. A method of measuring accuracy of concentration in sending liquid in a gradient by a liquid sender in a liquid chromatography system, which has the liquid sender that is capable of mixing a first solvent and a second solvent with each other to make a mobile phase that is a mixture of the first solvent and the second solvent, adjusting a concentration of the second solvent in the mobile phase made of the mixture of the first solvent and the second solvent to a predetermined setting value and sending the mobile phase, and is provided with a separation column and a detector on an analysis flow path through which the mobile phase from the liquid sender flows, wherein
   a first organic solvent containing liquid that does not include a component to be detected for measuring the accuracy of the concentration in the sending liquid in the gradient by the liquid sender is used as the first solvent before mixing,
   a second organic solvent containing liquid that includes the component to be detected is used as the second solvent before mixing,
   the second organic solvent containing liquid being adjusted to have a concentration of an organic solvent at which the component to be detected is not substantially held or concentrated in the separation column,
   the mobile phase is sent while a setting value of the concentration of the second solvent in the mobile phase is changed over time with the separation column provided on the analysis flow path,
   the component to be detected in the mobile phase that passes through the separation column is detected by the detector, and
   an actual concentration of the second solvent in the mobile phase that is sent at each setting value is found based on a detection signal of the detector.

2. The method according to claim 1, wherein the first solvent is a liquid mixture of water and methanol, and the second solvent is a liquid mixture of water and methanol containing caffeine.

3. A liquid chromatography system comprising:
   a liquid sender that is capable of mixing a first solvent and a second solvent with each other to make a mobile phase that is a mixture of the first solvent and the second solvent, adjusting a concentration of the second solvent in the mobile phase made of the mixture of the first solvent and the second solvent to a predetermined setting value and sending the mobile phase;
   an analysis flow path through which the mobile phase from the liquid sender flows;
   a separation column that is provided on the analysis flow path to separate a sample injected into the analysis flow path;
   a detector that is provided at a position farther downstream than the separation column on the analysis flow path to detect a component of a sample separated in the separation column; and
   a gradient accuracy measurer configured to
   use a first organic solvent containing liquid that does not include a component to be detected for measuring accuracy of concentration in sending liquid in a gradient by the liquid sender as the first solvent before mixing during the measurement of the accuracy of the concentration in the sending liquid in the gradient,
   use a second organic solvent containing liquid that includes the component to be detected as the second solvent during the measurement of the accuracy of the concentration in the sending liquid in the gradient, the second organic solvent containing liquid being adjusted to have a concentration of an organic solvent at which the component to be detected is not substantially held or concentrated in the separation column, send the mobile phase while changing a setting value of the concentration of the second solvent in the mobile phase over time, detect the component to be detected in the mobile phase that passes through the separation column by the detector, find an actual concentration of the second solvent in the mobile phase that is sent at each setting value based on a detection signal of the detector, and measure the accuracy of the concentration in the sending liquid in the gradient.

4. The liquid chromatography system according to claim 3, wherein the first solvent is a liquid mixture of water and methanol, and the second solvent is a liquid mixture of water and methanol containing caffeine.

\* \* \* \* \*